Jan. 16, 1962 E. E. REED 3,017,057
LIQUID FLOW CONTROL SYSTEM
Filed Aug. 3, 1956 5 Sheets-Sheet 1

INVENTOR.
E. E. REED
BY
ATTORNEYS

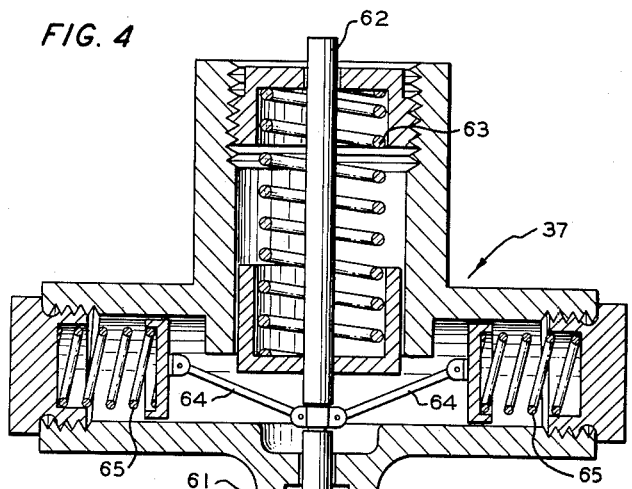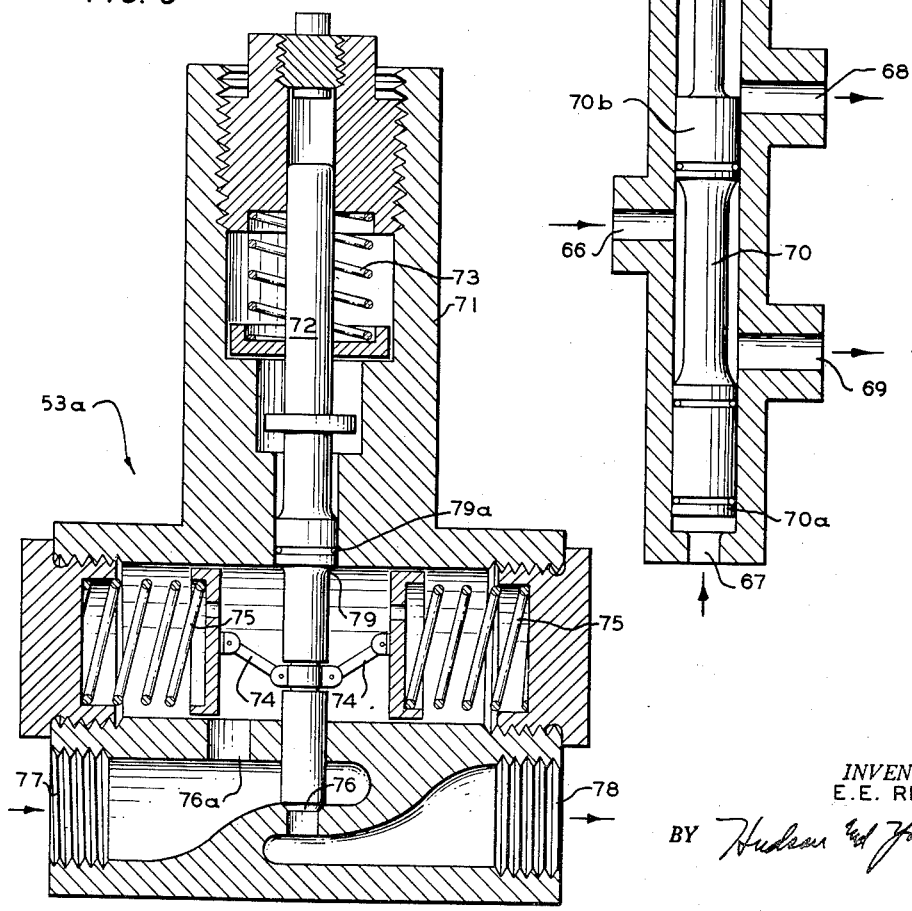

INVENTOR.
E.E. REED

Jan. 16, 1962   E. E. REED   3,017,057
LIQUID FLOW CONTROL SYSTEM
Filed Aug. 3, 1956   5 Sheets-Sheet 4

INVENTOR.
E. E. REED
BY Hudson and Young
ATTORNEYS

Jan. 16, 1962   E. E. REED   3,017,057
LIQUID FLOW CONTROL SYSTEM
Filed Aug. 3, 1956   5 Sheets-Sheet 5

INVENTOR.
E.E. REED
BY
ATTORNEYS

United States Patent Office 3,017,057
Patented Jan. 16, 1962

3,017,057
LIQUID FLOW CONTROL SYSTEM
Edwin E. Reed, Bartlesville, Okla., assignor to Phillips Petroleum Company, a corporation of Delaware
Filed Aug. 3, 1956, Ser. No. 601,877
5 Claims. (Cl. 222—318)

This invention relates to apparatus for applying liquid fertilizer, or other fluid treating agents to soils such as soil fumigants, insecticides, nematocides, etc. In one aspect it relates to apparatus for injecting such liquid materials into soil through nozzles adapted for high pressure injection. In another aspect it relates to apparatus for injecting such materials into soils wherein safety features are provided. In still another aspect it relates to apparatus for injecting such materials into soils wherein injection is not started until the apparatus is supplying the liquid material at a suitable pressure, or the apparatus terminates injection when the system pressure falls below a suitable injection pressure. In yet another aspect it relates to fluid supply system apparatus, pressure control valves and other subcombinations useful with the system.

The apparatus of my invention is particularly useful for applying or injecting fluid fertilizer or other fluid treating material to soils under pressures within the range of about 400 p.s.i.g. to about 5,000 p.s.i.g. (pounds per square inch gage). The particular pressure required will, for the most part, be dependent upon the type of soil or ground into which the injection is made, harder and more compact soils require the higher pressures while for loose and sandy soils lower pressures can be used. When desired, and in some cases, it is advantageous to use a parting blade or a furrow-making apparatus to provide a continuous opening in the soil into which the liquid is injected. Ordinarily, when providing such an opening in the soil, a roller is provided for following the injection nozzle so as to close or cover opening for maximum retention of the injected material.

An object of my invention is to provide novel apparatus for injecting fluid treating agents into soil.

Another object of my invention is to provide novel apparatus for injecting fluid treating material into soil, which apparatus is at least partly automatic and which provides safety features for eliminating overtreating when the treating vehicle on which it is mounted is not moving and preventing discharge of fluid treating material at such times when the system has not provided proper injection pressure.

Yet another object of my invention is to provide such an apparatus which is mounted on an automotive vehicle and which is easily and safely operated in conjunction therewith.

Numerous other objects and advantages will be apparent to those skilled in the art upon reading the accompanying specification, drawing and claims.

FIGURE 3 is an elevational view, partly in section, of a 2-way snap-action mechanical valve for use as an alternate for a portion of the apparatus of FIGURE 1.

FIGURE 4 is a 3-way mechanical snap-action valve for use as an alternate for a portion of the apparatus of FIGURE 2.

Figure 1:
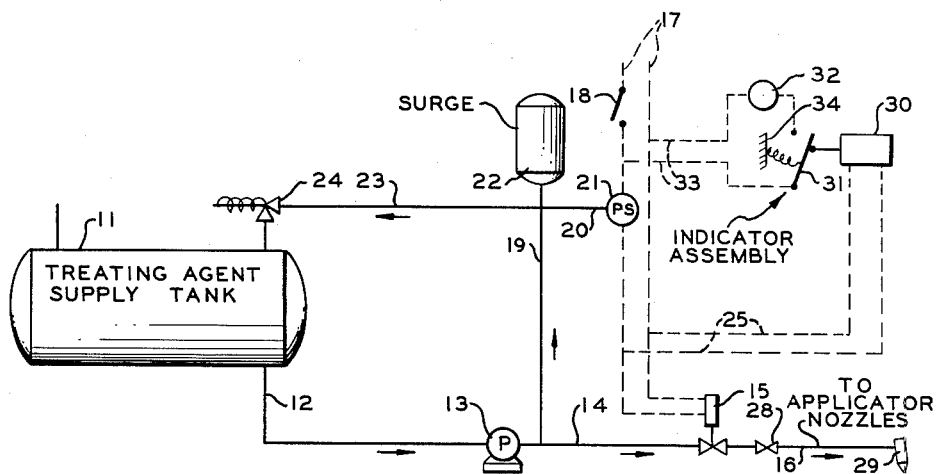
FIGURE 1 illustrates diagrammatically one embodiment of apparatus for applying fluid to soils.

According to my invention I provide a system for supplying fluid under pressure to a fluid dispensing nozzle comprising, in combination, a supply tank for said fluid, a conduit leading from the normally liquid containing space of said tank to said dispensing nozzle, a fluid transmitting pump in said conduit, a fluid flow control valve in said conduit intermediate said pump and said nozzle, and a valve operating assembly, said valve operating assembly being adapted to open and to close said flow control valve in response to fluid outlet pressure from said fluid transmitting pump.

In the drawing like reference numerals refer to similar apparatus parts.

Referring to the drawing, and specifically to FIGURE 1, the apparatus comprises a treating agent supply tank 11. This supply tank is provided with a number of connections, some of which are not shown, for filling the tank, a fluid outlet connection, a pressure gauge, liquid level gauge, a relief valve and a tube connected, for example, to the bottom of the tank for outlet of treating agent for injection into the soil. The connections for these various purposes are conventional and will not be described in detail. Fluid outlet pipe 12 conducts treating agent to a pump 13 which is powered preferably by the engine of the vehicle on which the assembly is mounted. The pump outlet pipe 14 leads to a solenoid flow control valve 15. From this valve a pipe 16 leads to one or more applicator nozzles 29 and is provided with a manually operable valve 28 for closing pipe 16 when the apparatus is not in use. A pipe 19 connects with pump discharge pipe 14 and leads to a surge tank 22. A pipe 23 connects pipe 19 with a pressure relief valve 24. This pressure relief valve is set at a pressure higher than the normal maximum operating pressure of the pump 13 and thereby operates as a safety measure to prevent rupture of pipes in case certain portions of the apparatus fail to function properly. Pipe 23, of course, is actually a by-pass line and treating fluid which passes through the pressure relief valve 24 is returned to the supply tank 11. Pipe 20 connects pipe 19 with a pressure switch 21 which opens and closes an electrical circuit in leads 17 to the solenoid of the solenoid valve 15. To make certain that the solenoid is not actuated before the vehicle is in forward movement, a switch 18 is provided which is closed by the forward motion of the vehicle and is opened when the vehicle ceases its forward motion. Thus, this switch 18 insures that the solenoid valve 15 will not remain open to allow excessive injection of liquid treating agent into the soil when the vehicle is not in motion even though the pressure from pump 13 is sufficient to operate pressure switch 21 for closing its portion of the circuit. Switch 18 is in some instances a centrifugal switch operated by a gear or a belt and pulley from the vehicle.

An indicator assembly is illustrated in this FIGURE 1, indicating to the operator when the solenoid valve 15 is open and when it is not open. This indicator assembly includes leads 25 which are connected with leads 17 between pressure switch 21 and the solenoid of valve 15, and a solenoid 30. When current flows through solenoid 30, a spring-loaded switch 31 is opened to open the circuit through leads 33 and under such condition indicator 32 does not function thereby indicating to the operator that the solenoid valve 15 is open. If, for any reason whatever pressure switch 21 opens the circuit in leads 17, current is cut off to leads 25 and the spring-loaded switch 31 closes and under this condition indicator 32 operates. This indicator 32 can be an electric light or a bell or vibrator or other indicator means for attracting the attention of the operator. The spring of the spring-loaded switch 31 is illustrated as being attached to a support 34 and this support can be any suitable portion of the apparatus. This indicator is imperative, however, when the vehicle is not moving since opening switch 18 breaks the indicator circuit.

The apparatus of FIGURE 1 operates as follows: the pressure switch 21 is set to close at a predetermined high pressure and to open at a predetermined low pressure below the mentioned high pressure. These high and low pressures can be the aforementioned 5,000 p.s.i.g. and 400 p.s.i.g. Pump 13 is preferably operated by a power take off from the engine of the vehicle and upon starting of the engine the power take off is thrown in gear and pump 13 operates to pump treating agent from tank 11 through pipe 12, pipes 19 and 23 through pressure relief valve 24 for return to the supply tank. When the high pressure setting of the pressure switch 21 is, for example, 5,000 p.s.i.g., the pressure relief valve 24 is set at some pressure value above 5,000 p.s.i.g. to allow pressure switch 21 to close before the pressure relief valve 24 operates. Thus, when pump pressure reaches about 5,000 p.s.i.g., pressure switch 21 closes but the solenoid valve 15 does not open because switch 18 is open. If the vehicle is in the field which is to be treated, the manually operable valve 28 is opened, and upon forward movement of the vehicle, switch 18 is closed which permits flow of current through the solenoid to open valve 15 and treating agent flows through valve 28 in pipe 16 to the applicator nozzle or nozzles 29. At such time, current flows through leads 25 to solenoid 30 thereby opening the spring-loaded switch 31 of the indicator assembly. If, for example, pipe 16, pipes 14, 19, 20 or 23, surge tank 22 or relief valve 24 should spring a leak the pressure switch 21 would open the circuit in lead 17 thereby closing valve 15 and causing the indicator 32 to operate the latter notifying the operator that something is wrong. When the operator stops the forward motion of the vehicle, switch 18 opens and the indicator 32 ceases to function.

Only a single manually operable valve 28 is specifically disclosed in the apparatus of FIGURE 1 but it is understood that other manually operable valves are supplied as, for example, in pipe 12 and another in pipe 23 adjacent the supply tank 11 in case the pump, pressure switch, or surge tank needs attention.

Figure 2:
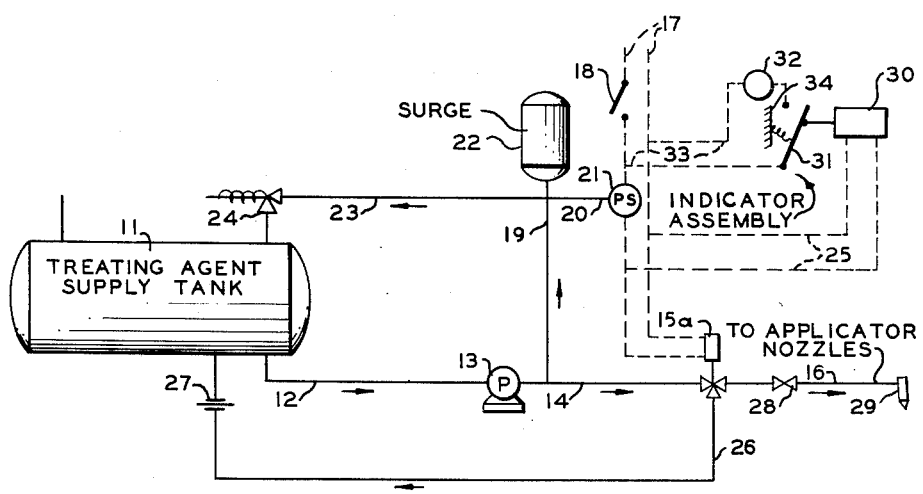
FIGURE 2 illustrates diagrammatically one embodiment of apparatus for applying fluid to soils.

In the embodiment illustrated in FIGURE 2, a three-way solenoid valve 15a is used in place of the 2-way solenoid valve 15 of FIGURE 1. The third outlet of this 3-way valve is connected by a pipe 26, provided with an orifice plate 27, to the treating tank 11. The remainder of the apparatus of FIGURE 2 is substantially the same as that illustrated in FIGURE 1 and an advantageous operational difference results from the use of the 3-way valve in that when the valve is closed to line 16, the third outlet is open to pipe 26 so that as pump 13 is gaining speed upon starting of the apparatus the treating liquid flows from the pump through pipe 14 and pipe 26 through the orifice plate 27 to the treating tank. The opening in the orifice plate is such that the flow of liquid therethrough is substantially the same as the flow through the one or more nozzles 29 so that when the pump outlet pressure reaches the desired high pressure at which pressure switch 21 closes the circuit, the switch of liquid flow in pipe 14 from pipe 26 to pipe 16 is made without a change in flow of fluid. In the apparatus of FIGURE 1, when the 2-way valve 15 opens, there is a momentary pressure drop in pipe 14 thus requiring that the pressure switch 21 in FIGURE 1 be set at sufficiently high pressure that this momentary pressure drop does not reach the low pressure at which the pressure switch opens the circuit in pipe 17 to close valve 15. Thus, in using the 3-way valve in FIGURE 2, the switch of fluid flow from pipe 26 to pipe 16 is made without any or substantially any drop in pressure in pipe 14.

Other means can, in some cases, be substituted for those illustrated in FIGURES 1 and 2 for accomplishing the same control of flow of treating fluid. In the embodiment illustrated in FIGURE 6 a hydraulically operated flow control valve is substituted for the solenoid valve 15 of FIGURE 1. In this hydraulically operated system the flow of the fertilizer is substantially the same as that illustrated in FIGURE 1 but additional apparatus is required for providing a hydraulic liquid for operating the valve. This additional equipment comprises a hydraulic liquid flow tank 41 containing a suitable hydraulic liquid such as an oil 42 of suitable viscosity. A pump 43 withdraws oil from tank 41 and forces it through pipe 44 to the operating motor of a hydraulically operated 2-way valve 51. Pipe 44 is provided with a pressure relief valve 48 which is adapted to permit flow of oil from pipe 44 through pipe 49 to tank 41 in case pressure exceeds a predetermined maximum pressure. A pilot valve assembly 50, as illustrated, is inserted in pipe 44 and operates to control the flow of oil therethrough in response to fluid pressure in pipe 14 originating in pump 13. This assembly is intended to operate in such a manner that when the fluid transfer pump 13 is connected through the power take off to the vehicle motor, fluid is transferred from pipe 12 into pipe 14 and pressure therein increases. In case the vehicle is not moving fluid from pipe 14 flows through pipes 19 and 23 through the relief valve 24 into the storage tank 11. The oil pump 43 of the hydraulic system is driven by the forward motion of the vehicle and upon starting of the vehicle pressure in pipe 44 increases and when a predetermined maximum pressure is obtained in pipe 44 the pressure relief valve 48 operates to by-pass the oil through pipe 49 into tank 41. With pump 13 operating and providing the desired pressure in pipe 14 the pilot valve 50 opens to allow hydraulic liquid to flow from pipe 44 into the motor of the hydraulically operated 2-way motor valve 51 thereby opening the valve to allow fluid from pipe 14 to flow through valve 28 in pipe 16 to the nozzle or nozzles 29. This valve 28 is manually operated for closing when the vehicle is stored overnight or for such a period of time as it is desired to make certain that there is no loss of treating liquid through nozzles 29.

When the power take off operates pump 13 to provide the required high pressure for opening the pilot valve 50 and if the vehicle is not moving, pressure is not transmitted from pipe 44 to the motor of valve 51 and this valve does not open. If the vehicle is moving, pump 43 is putting up pressure and hydraulic fluid does not flow through the pilot valve 50 unless pump 13 is operated by the power take off to put up pressure in pipe 14.

As an indicator for the operator of this device, an alarm system 60 is provided and this system operates to light a light or ring a bell to warn the operator when the hydraulically operated valve 51 is closed and treating fluid is not being ejected from nozzle 29. This warning system, as illustrated comprises a battery 56 from which current flows through a circuit 53 with the ends thereof grounded at 57. Switch 55 operates in such a manner that when the valve stem 58 of valve 51 moves downward closing the valve, switch 55 closes the circuit 53 and alarm 54 lights or rings as the case may be. In order that this alarm system will not operate when the vehicle is not moving, a spring-loaded switch 59 is provided. This switch is adapted to close circuit 53 while the vehicle is moving forward and to open the circuit when the vehicle is not moving forward. Switch 59 is in some instances a centrifugal type switch operated by a gear or belt and pulley take off from the vehicle, and can if desired, be similar to switch 18 of FIGURES 1 and 2.

Figure 6:
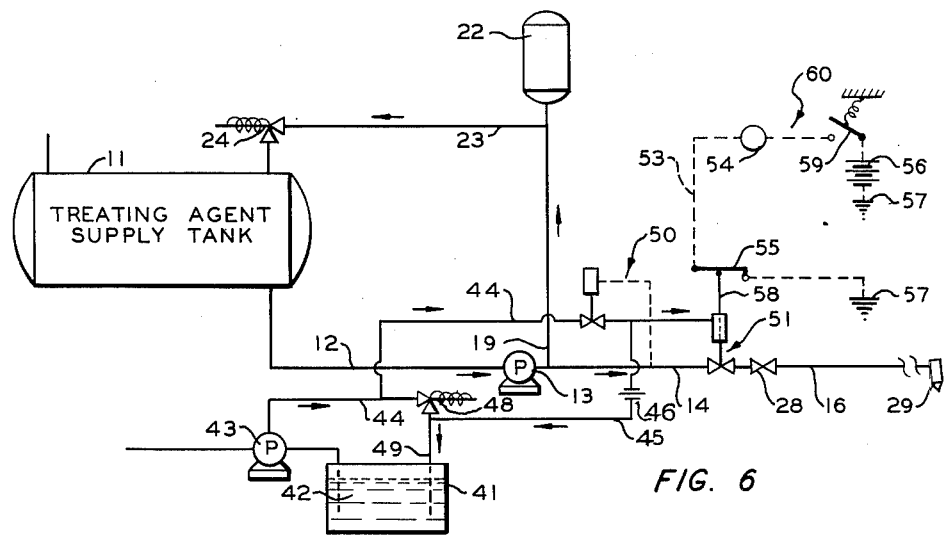
FIGURE 6 is a diagrammatic view of another arrangement of apparatus embodying a hydraulically operable 2-way valve for controlling flow of liquid treating agent.
Figure 7:
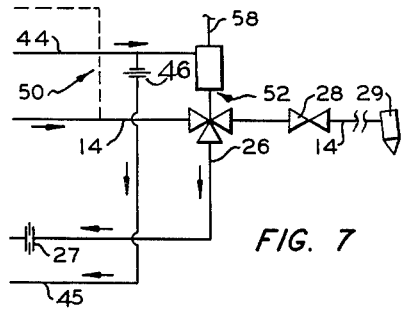
FIGURE 7 is a diagrammatic view of treating apparatus similar to that of FIGURE 6 but which employs a 3-way hydraulically operable flow control valve.

In the embodiment illustrated in FIGURE 7 the apparatus is similar to that of FIGURE 6 with the exception that a 3-way hydraulically operated valve 52 replaces the 2-way valve of FIGURE 6. The third outlet of the 3-way valve is connected by pipe 26 containing orifice plate 27 to the supply tank 11 in the same manner as the 3-way valve was connected to tank 11 in FIGURE 2. In this manner the 3-way valve operates to close off the flow of fluid through conduit 26 and open the flow in pipe 14 without pressure fluctuation, the orifice of orifice plate 27 permitting substantially the same flow of liquid therethrough as nozzle or nozzles 29.

Figure 9:
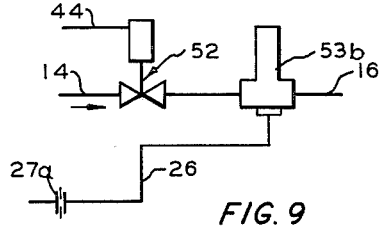
FIGURE 9 illustrates diagrammatically the form of apparatus illustrated in FIGURE 8 but which employs a hydraulically operable 3-way valve for controlling flow of liquid treating agent in conjunction with a valve controlled by the forward motion of the vehicle upon which the system is mounted.

The orifice of the orifice plate assembly 27 of FIGURES 2, 7 and 9, can, if desired, be a needle valve in place of an actual orifice plate. When a needle valve is used, the needle is adjusted so that when the main flow control valve operates there is substantially no change of pressure in the outlet of the pump 13 when the 3-way valves switch flow from pipe 26 to pipe 14.

In FIGURES 6 and 7 pipe 45 is provided with a restriction or orifice 46 in order to maintain a proper working pressure in pipe 44 when valve 50 is open. Restriction 46 obviously can be an orifice plate, as illustrated or it can be a needle valve, in case ease of adjustment of pressure in pipe 44 is desired.

Figure 8:
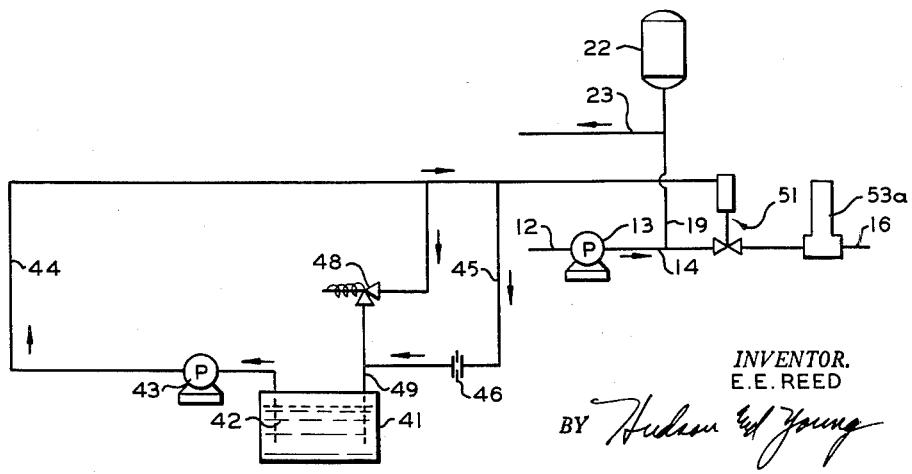
FIGURE 8 illustrates diagrammatically an assembly of apparatus using a hydraulically operable 2-way valve for control of flow of treating agent in conjunction with a valve controlled by forward motion of the vehicle upon which the system is mounted.

In FIGURE 8 the hydraulic pump 43 is driven by the forward motion of the vehicle and the discharge of the pump operates the hydraulically operable motor of motor valve 51; and, in series with this valve is a mechanical snap-action valve adapted to open only when a predetermined maximum treating fluid pressure is reached in the discharge of the treating pump 13. In this embodiment when the vehicle is not moving, valve 51 is closed and the apparatus will not discharge treating fluid through the applicator nozzles. Also, when the treating fluid pump 13 is in operation through the power take off, valve 51 remains closed until the vehicle moves. Even after the vehicle moves the mechanical pressure operated two-way valve 53a remains closed until a predetermined high operating pressure reaches this valve. When this high pressure is reached, this mechanical valve opens and with the vehicle in motion the apparatus operates to eject treating agent from the nozzles, not shown in FIGURE 8.

In FIGURE 9 the apparatus is substantially the same as that illustrated in FIGURE 8, with the exception that the mechanical flow control valve is a 3-way valve 53b in place of the 2-way valve 53a of FIGURE 8. The third outlet of valve 53b is connected by pipe 26 containing an orifice plate or needle valve 27a similar to that of FIGURES 2 and 7. In FIGURE 9 this 3-way valve operates to change flow of fluid in pipe 14 from pipe 26 to pipe 16 without pressure fluctuation in pipe 14 once valve 52 is open. The mechanical snap-action valve 53b in pipe 16 opens to permit flow of treating fluid only when the liquid from pipe 14 reaches the valve under the desired maximum treating pressure.

Figure 10:
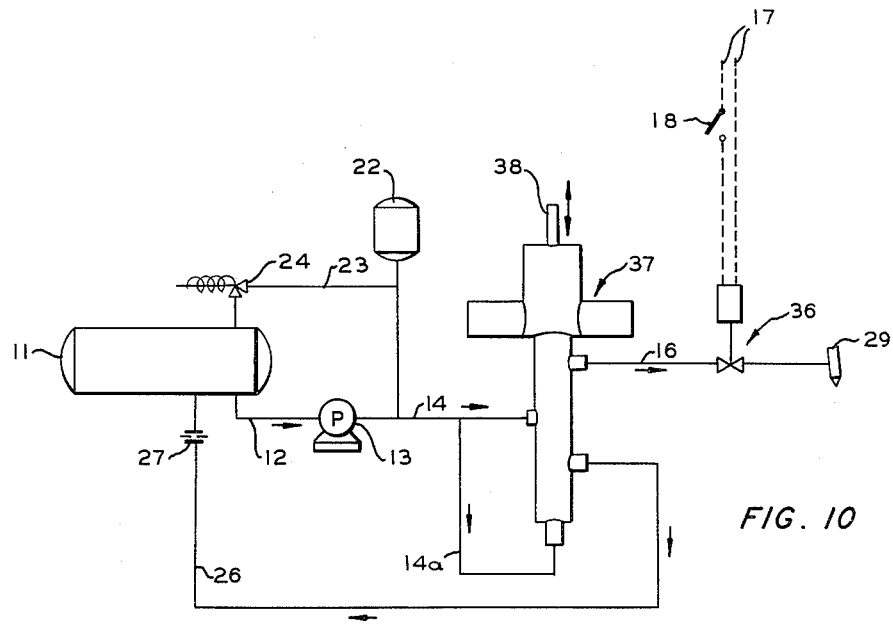
FIGURE 10 illustrates diagrammatically an arrangement of apparatus for opening the fluid treating agent flow control valve by pump pressure in series with an electrically operated valve or mechanically operated valve operating in conjunction with the forward motion of the applicator.

In the apparatus of FIGURE 10 a 3-way mechanical valve 37 is used in place of the solenoid valve of FIGURE 2 and in place of the 3-way hydraulically operated valve 52 of FIGURE 7. Pump pressure in pipe 14 is transmitted through pipe 14a to a piston, not shown, on the lower end of the valve stem 38 thereby raising the piston and the valve stem and closing the flow of liquid through pipe 26 and opening flow in pipe 16. As an indicator as to whether valve 37 is open or closed to pipe 16, valve stem 38 serves the purpose. When this valve stem is raised, as illustrated in FIGURE 10, the valve is open to pipe 16 and closed to pipe 26 and when the valve stem is lowered, for example, approximately flush with the top surface of the valve housing, the valve is closed to pipe 16 and is open to pipe 26. For control of this apparatus as regards forward motion of the vehicle a solenoid valve system 36 cooperates with switch 18, which when closed by the forward motion of the vehicle, permits energizing of the solenoid and opening of the valve. When the vehicle stops its forward motion, switch 18 opens thereby closing off flow of fluid to nozzle 29 irrespective of the operating position of the valve 37. Switch 18 is similar to switch 18 hereinbefore described relative to FIGURES 1 and 2.

In FIGURE 3 is illustrated an elevational view, partly in section, of a 2-way pressure operated snap-action valve 53a. This valve comprises a valve case or housing 71 in which is provided a valve stem 72, the lower end of which terminates as a poppet valve 76. A compression spring 73 biases the stem 72 downward. A toggle assembly is provided at a position intermediate the poppet valve 76 and the compression spring 73, the assembly comprising a pair of toggle rods 74 which are adapted to move in the direction of valve stem 72 and to permit expansion of a pair of compression springs 75. The toggle rods are pivoted at the several points indicated so that upon movement of the valve stem 72 upward and downward the rods move the compression springs into and out of compression. The operation of toggle assemblies is common in many mechanical applications and need for detailed explanation thereof is believed unnecessary. An opening 76a is provided in the housing as shown to provide communication between inlet 77 and the chamber in which the toggle assembly is positioned. The valve stem 72 is provided with an annular shoulder or piston 79 in such a manner that upon increase of pressure below shoulder 79 the upward force of the pressure tends to move the valve stem upward against the bias of compression spring 73 and against the bias of the toggle springs 75. The toggle springs 75 resist the upward movement of valve stem 72 until such time as the toggle rod pivot points adjacent the valve stem are off center upward, then the toggle springs assist the upward movement of valve stem against the bias of compression spring 73. A seal 79a is provided around the valve stem at the position indicated so that pressure will not leak upward between the valve stem and the valve body at this point.

When pressure on the inlet side of this valve assembly decreases to a predetermined low pressure at which it is desired to close the valve, the upward force against the annular piston or shoulder 79 is decreased to such an extent that the bias of compression spring 73 overcomes the bias of the toggle spring 75 and the force acting upward against annular piston 79 and the valve stem moves downward to close the poppet valve 76 against its seating surface thereby closing off flow of fluid from inlet 77 to outlet 78. By properly selecting the several compression springs used in the valve of FIGURE 3 the valve can be made to open at a predetermined high pressure and to close at a predetermined low pressure.

In FIGURE 4 is illustrated a 3-way valve 37 operating on the same principle as the valve 53a of FIGURE 3. In the valve of FIGURE 4 pressure fluid enters opening 67 in valve casing 61 thereby pushing valve stem 62 upward as a result of a total force applied to the under side of piston 70a. When the piston 70a and valve stem are at the upward extent of their line of movement, piston 70a closes outlet 69 and piston 70b moves above outlet 68 thereby opening this outlet for flow of fluid from inlet 66. The valve stem is provided with a small diameter section 70 intermediate the two pistons so that fluid can flow from inlet 66 through outlet 68 or outlet 69 depending upon the position of the slide valve. When pressure from inlet 67 decreases to a predetermined low value, the force exerted on the under side of piston 70a is decreased to such an extent that compression spring 63 biases valve stem 62 downward to close outlet 68 and to open outlet 69. This valve also is a toggle valve having toggle arms 64 and toggle springs 65 and these apparatus parts operate in the same manner as those described relative to FIGURE 3.

This 3-way valve of FIGURE 4 is suitable for use in the assembly illustrated in FIGURE 10 with, for example, outlet 68 being connected with pipe 16 to nozzle 29, outlet 69 being connected with orifice member containing by-pass pipe 26 and inlet 66 is connected with pipe 14 from the outlet of pump 13.

The 2-way snap-action valve of FIGURE 3 is suitable for use as valves 53a in FIGURES 8 and 9.

Figure 5:
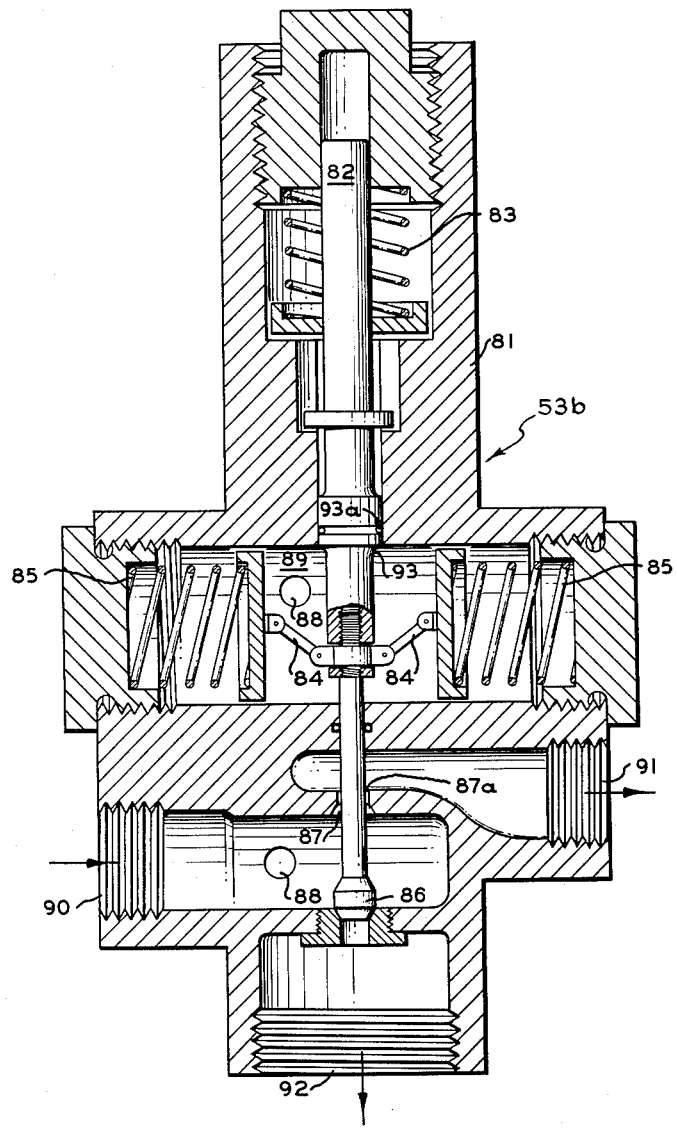
FIGURE 5 is another embodiment of a 3-way snap-action mechanical valve.

Still another embodiment of 3-way valve is illustrated in FIGURE 5. This valve also is a snap-action toggle valve and operates in general in the same manner as the valve in FIGURE 4. The valve of FIGURE 5 comprises a case or housing 81 which accommodates a valve stem or valve rod 82 provided with a seal 93a as illustrated. This valve is a double-acting poppet valve having a head 86 attached to valve rod 82 as shown. The double-acting poppet valve or valve head 86 is disposed to seat to close off flow of fluid from inlet 90 to outlet 92 at the lower end of its extent of movement and to seat against a seat 87 when the valve head 86 is at the upper end of its extent of movement to close off flow of fluid from inlet 90 to outlet 91. An opening 87a is provided for communication between inlet 90 and outlet 91. The operation of this valve is a toggle operation similar to that explained relative to FIGURES 3 and 4, the apparatus parts comprising mainly a compression spring 83, toggle arms 84 and toggle springs 85. Conduit 88 provides communication between inlet 90 and the chamber 89 in which are disposed toggle arms 84 and springs 85. High pressure fluid from inlet 90 is transmitted to chamber 89 and exerts pressure against an annular piston surface 93 to force valve rod 82 and the valve head 86 upward against the compression of spring 83 and springs 85 until such time as the toggle arms 84 move upward and springs 85 assist the valve stem and valve movement. When this condition exists, opening 87a is closed and fluid flows from inlet 90 to outlet 92. When pressure decreases in inlet 90 and in chamber 89 to a predetermined low pressure, the bias of spring 83 overcomes the combined action of the low pressure against surface 93 and the compression of the toggle springs and the valve stem and valve head move downward to close the valve against flow of fluid from inlet 90 to outlet 92 and to open the valve to flow fluid from inlet 90 through opening 87a to outlet 91. This 3-way valve can, when desired, be used in applications in which the valve of FIGURE 4 is used. The valve 53b of FIGURE 5 is used in the embodiment of FIGURE 9.

Figure 11:
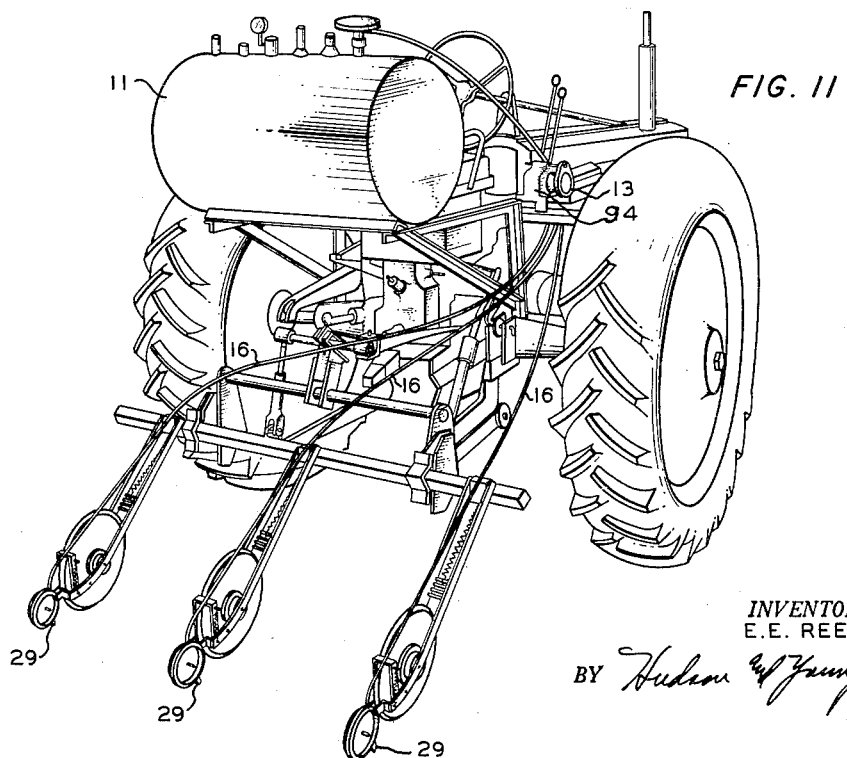
FIGURE 11 illustrates diagrammatically a more or less conventional farm type tractor upon which is mounted the liquid treating agent flow control apparatus of my invention.

Any of the apparatus embodiments illustrated in FIGURES 1, 2, 6, 7, 8, 9 and 10 are mounted on vehicles for use in applying the liquid treating agent to the soil as mentioned hereinbefore. Such a vehicle and the particular installation of apparatus parts on the vehicle are described in detail in a copending application, Serial No. 499,816, filed April 7, 1955, now abandoned, and such installation will not be described herein in detail. Briefly, treating agent supplied tank 11 is attached to the vehicle as illustrated in FIGURE 11. A power take off assembly 94 provides motive power for pump 13 for providing sufficient pressure for operating all the pressure responsive and pressure operative equipment hereinbefore described. Tubes or pipes 16 correspond to pipe 16 of FIGURES 1, 2, 6, 7, 8, 9 and 10 while spray nozzles 29 are seen operatively positioned in FIGURE 11.

The amounts of treating agents as, for example, liquid fertilizer to be applied to a soil and particular details of operation are fully disclosed in the above mentioned copending application. Such fertilizers as anhydrous ammonia, aqueous ammonia, aqueous ammonium sulfate with or without excess of ammonia or with or without potassium chloride for supplying potash, aqueous ammonium nitrate, etc., are applied with the apparatus of my invention.

As other treating agents, for example, fumigants, ethylene bromide, methyl bromide, 1,3-dichloropropene, preferably contained in D—D mixture, chloropicrin, any form of chlorobromopropene, 1,4-dichlorobutene, carbon disulfide, etc., are applied with the apparatus of my invention.

A particularly suitable nozzle for use in applying the above mentioned fluids to soil is described in the above mentioned copending application.

In the valve embodiments of FIGURES 3 and 5 it is preferable to provide a vent for pressure relief above seal 79a in FIGURE 3 and a vent above seal 93a in FIGURE 5 in case of leakage around the seals.

While certain embodiments of the invention have been described for illustrative purposes, the invention obviously is not limited thereto.

I claim:

1. A system for supplying fluid under pressure to a fluid dispensing nozzle comprising, in combination, a supply tank for said fluid, a dispensing nozzle, a first conduit leading from the normally liquid containing space of said tank to said dispensing nozzle, a fluid transmitting pump in said first conduit, a fluid flow control valve in said first conduit intermediate said pump and said nozzle, said fluid flow control valve being a pressure operated snap action toggle valve assembly, said assembly having a valve sealing surface, a valve head and a valve stem attached to said head, said valve head being adapted to cooperate with said sealing surface to open and to close said valve, a pair of toggle springs cooperating with said valve stem biasing said valve open and closed with respect to said sealing surface, a separate spring cooperating with said valve stem biasing said valve closed with respect to said sealing surface, said valve stem comprising a piston, a second conduit communicating said first conduit, intermediate said pump and said fluid flow control valve, and said piston for transmitting fluid pressure to said piston, said valve stem being adapted to open said valve from its sealing surface in response to a predetermined pump outlet fluid pressure applied against said piston thereby moving said valve stem against the bias of said separate spring and to close said valve with respect to its sealing surface under the bias of said separate spring in response to a pressure below said predetermined fluid pressure applied against said piston.

2. A motor vehicle mounted system for supplying fluid under pressure to a fluid dispensing nozzle comprising, in combination, a supply tank, a dispensing nozzle, a first conduit communicating the normally liquid containing space of said supply tank with said dispensing nozzle, a fluid transmitting pump in said conduit, a motor operatively connected with said pump, a three-way snap-action fluid flow control valve in said conduit, said valve comprising a housing having a first flow passage and a second flow passage for flow of fluid therethrough, said first and second flow passages having a common inlet and separate first and second outlets respectively, a slide valve disposed slidably in said housing, said slide valve comprising a first piston and a second piston spaced from one another on a common valve stem, the pistons and valve stem being disposed operably in said housing, said valve stem and pistons being adapted for axial movement in said housing, said first piston being intermediate said inlet and said first outlet thereby closing said first flow passage and said second piston being on the side of said second outlet opposite the inlet and thereby opening said second flow passage when the valve stem is at one end of its extent of travel, said second piston being intermediate said inlet and said second outlet thereby closing said second passageway and said first piston being on the side of said first outlet opposite said inlet thereby opening said first passageway when the valve stem is at the other end of its extent of movement, a first spring biasing said valve stem to said one end of its extent of travel, a toggle assembly cooperating with said valve stem to resist initial movement from either end of its extent of movement and to assist final movement of said valve stem to either end of its extent of movement, an opening in said housing at the end of said valve stem adjacent said second piston, a second conduit communicating said opening with said first conduit intermediate said pump and said valve, said first conduit including said first passageway, a third conduit communicating said second outlet with said tank, a restriction in said third conduit and a power take off from said motor.

3. A motor vehicle mounted system for supplying fluid under pressure to a fluid dispensing nozzle comprising, in combination, a supply tank, a dispensing nozzle, a first conduit communicating the normally liquid containing space of said supply tank with said dispensing nozzle, a fluid transmitting pump in said conduit, a motor operatively connected with said pump, a three-way snap-action fluid flow control valve in said conduit, a second conduit leading from said first conduit intermediate said pump and said valve to said tank, a pressure relief valve in said second conduit, a pressure surge tank in communication with said first conduit intermediate said pump and said valve, said valve comprising a housing having a first flow passage and a second flow passage for flow of fluid therethrough, said first and second flow passages having a common inlet and separate first and second outlets respectively, a slide valve disposed slidably in said housing, said slide valve comprising a first piston and a second piston spaced from one another on a common valve stem, the pistons and valve stem being disposed operably in said housing, said valve stem and pistons being adapted for axial movement in said housing, said first piston being intermediate said inlet and said first outlet thereby closing said first flow passage and said second piston being on the side of said second outlet opposite the inlet and thereby opening said second flow passage when the valve stem is at one end of its extent of travel, said second piston being intermediate said inlet and said second outlet thereby closing said fourth conduit and said first piston being on the side of said first outlet opposite said inlet thereby opening said first passageway when the valve stem is at the other end of its extent of movement, a first spring biasing said valve stem to said one end of its extent of travel, a toggle assembly cooperating with said valve stem to resist initial movement from either end of its extent of movement and to assist final movement of said valve stem to either end of its extent of movement, an opening in said housing at the end of said valve stem adjacent said second piston, a fourth conduit communicating said opening with said first conduit intermediate said pump and said valve, said first conduit including said second passageway, a fifth conduit communicating said second outlet with said tank, a restriction in said fifth conduit and a power take off from said motor.

4. A system for supplying fluid under pressure to a fluid dispensing nozzle comprising, in combination, a supply tank for said fluid, a fluid dispensing nozzle, a first conduit leading from the normally liquid containing space of said tank to said dispensing nozzle, a fluid transmitting pump in said conduit, a normally closed 3-way pressure operative fluid flow control motor valve in said conduit intermediate said pump and said nozzle, said valve having an inlet and a pair of outlets, said inlet and one of said outlets being in said first conduit, a second conduit communicating the other of said outlets with said supply tank, a flow constricting means in said second conduit, and a valve operating assembly comprising conduit means communicating the motor of said motor valve with said first conduit intermediate said pump and said valve, and said valve operating assembly being adapted to open said flow control valve in response to fluid outlet pressure from said pump.

5. A system for supplying fluid under pressure to a fluid dispensing nozzle comprising, in combination, a supply tank for said fluid, a dispensing nozzle, a first conduit leading from the normally liquid containing space of said tank to said dispensing nozzle, a fluid transmitting pump in said conduit, a normally closed fluid flow control motor valve in said conduit intermediate said pump and said nozzle, a second conduit leading from said first conduit intermediate said pump and said fluid flow control valve to said tank, a pressure relief valve in said second conduit, a pressure surge tank communicating with said first conduit intermediate said pump and said flow control valve, a valve operating assembly comprising motive power transmitting means communicating with the motor of said fluid flow control valve and with said first conduit intermediate said pump and said valve, said valve operating assembly being adapted to open said flow control valve in response to outlet pressure of said pump, said fluid flow control valve being a three-way pressure operative valve having an inlet and a pair of outlets, said inlet and one outlet of said pair of outlets being in said first conduit, a third conduit communicating the other outlet of said three-way valve with said supply tank, and a fluid flow constricting means in said third conduit.

References Cited in the file of this patent

UNITED STATES PATENTS

| | | |
|---|---|---|
| 1,984,851 | Vinz | Dec. 18, 1934 |
| 1,988,956 | Newell | Jan. 22, 1935 |
| 2,021,271 | Thomas | Nov. 19, 1935 |
| 2,077,257 | Ofeldt | Apr. 13, 1937 |
| 2,116,605 | Kelly | May 10, 1938 |
| 2,302,553 | Jones | Nov. 17, 1942 |
| 2,402,355 | Whaley | June 18, 1946 |
| 2,671,632 | Palmer | Mar. 9, 1954 |
| 2,696,785 | Blue | Dec. 14, 1954 |
| 2,754,289 | Meyer | July 10, 1956 |
| 2,757,044 | Gerbracht | July 31, 1956 |

UNITED STATES PATENT OFFICE
CERTIFICATE OF CORRECTION

Patent No. 3,017,057                        January 16, 1962

Edwin E. Reed

It is hereby certified that error appears in the above numbered patent requiring correction and that the said Letters Patent should read as corrected below.

Column 9, line 49, for "fourth conduit" read -- second flow passage --.

Signed and sealed this 26th day of June 1962.

(SEAL)
Attest:

ERNEST W. SWIDER                        DAVID L. LADD
Attesting Officer                          Commissioner of Patents